United States Patent [19]

Beaver

[11] 4,216,589
[45] Aug. 12, 1980

[54] SIGHTING DEVICE FOR SURVEILLANCE CAMERA

[75] Inventor: Richard C. Beaver, Inglewood, Calif.

[73] Assignee: American Electronics, Inc., Fullerton, Calif.

[21] Appl. No.: 962,307

[22] Filed: Nov. 20, 1978

[51] Int. Cl.³ .................... G01B 13/02; G03B 13/02; G03B 11/00; H04N 5/30

[52] U.S. Cl. .................................. 33/266; 354/199; 354/219; 354/295; 358/224

[58] Field of Search ............ 33/266; 354/199, 219 R, 354/219 IF, 295; 358/224; 353/119

[56] References Cited

U.S. PATENT DOCUMENTS

| 783,665 | 2/1905 | Avril | 33/266 |
|---|---|---|---|
| 2,048,365 | 7/1936 | Agate et al. | 353/43 |
| 2,747,282 | 5/1956 | Lea | 33/266 |

FOREIGN PATENT DOCUMENTS

| 223941 | 10/1962 | Austria | 354/219 |
|---|---|---|---|
| 5118 | 10/1955 | Fed. Rep. of Germany | 354/219 IF |

Primary Examiner—Steven L. Stephan
Attorney, Agent, or Firm—Wills, Green & Mueth

[57] ABSTRACT

A temporary sighting device which can be used on a surveillance camera during installation and adjustment, and which includes front and rear spaced apart, parallel walls, each of which contains a window provided with cross-hairs, whereby lines of sight extending through an intersection of the cross-hairs in the rear window and about the outer perimeter of the front window define the field of view of the camera. In the preferred form, the sighting device is produced from paper card stock and is foldable to a collapsed, flat position for shipping purposes.

7 Claims, 11 Drawing Figures

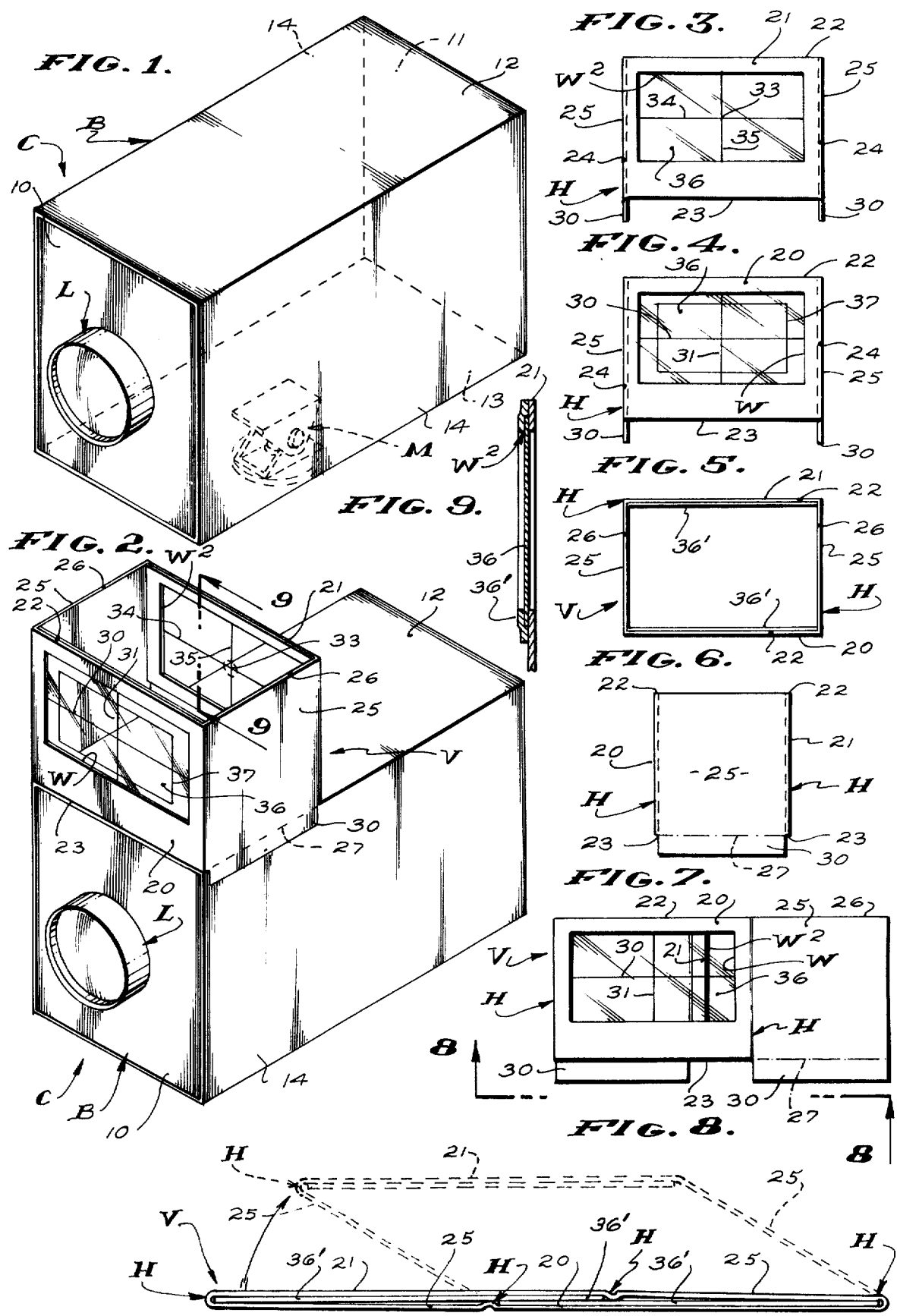

SIGHTING DEVICE FOR SURVEILLANCE CAMERA

BACKGROUND OF THE INVENTION

In stores, factories, banks and other business establishments where theft and other dangerous or undesirable activities are sought to be guarded against, it has become common practice to install monitoring cameras in strategic locations within such facilities to either continuously or intermittently record ongoing activities therein.

Such monitoring cameras can be self-contained power operated time-lapse photographic cameras or television monitoring cameras connected with remote video tape recorders or the like. Whichever of these two basic types of cameras are employed, they are, for economic and other equally important reasons, made as simple and as economical as is practical. As a result of the foregoing, many monitoring cameras are simple, substantially rectangular box-like units having lenses projecting from one end thereof, and do not include costly and space consuming accessories such as view finders.

As a result of the above, when installing and setting surveillance cameras which do not include view finders, great care and skill must be exercised by the installers of such cameras to assure that those areas to be monitored are within the fields of veiw of the cameras.

At the present time, the most common procedure is to estimate the area of coverage by each camera and then through trial and error and the developing of photographs, change the angular position and relationship of the cameras until the desired result is achieved.

SUMMARY OF THE INVENTION

It is a primary object of the present invention to provide a simple and effective sighting device for surveillance cameras which is such that it can be easily and conveniently used by a person of ordinary skill to effectively aim and/or set such a camera.

Another object of the invention is to provide a sighting device of the type referred to which is so economical that it can be supplied at little or negligible cost and can be expended or disposed of after use, if desired. More particularly, it is an object to provide such a sighting device which can be provided at no cost with each purchase of a predetermined number of surveillance cameras, e.g. as few as four cameras.

Yet another object of the invention is to provide a sighting device of the type referred to above which is light and foldable into a small, thin, flat unit which can be easily and conveniently stored and which can be conveniently and economically transported to purchasers or users of such cameras, both in the United States and to foreign countries, by ordinary mail service.

The sighting device of the present invention comprises a box-like frame of paper card stock folded to define case engaging and orienting side walls, and a pair of axially spaced parallel front and rear end walls with view finding windows therein and across which cross-hairs are extended. In the preferred form of the device, the cross-hairs are opaque lines applied to surfaces of thin, flat panes of transparent material within the windows in the spaced walls.

The side walls include lower edge portions which engage the sides of the camera and correctly align and position the sighting device when the front end wall is in vertical alignment with the front end of the camera.

DESCRIPTION OF THE DRAWINGS

FIG. 1 is a perspective view of a surveillance camera with which the sighting device of the present invention can be used;

FIG. 2 is a view similar to FIG. 1 with the sighting device of the present invention positioned on the camera for alignment purposes;

FIG. 3 is a rear view of the sighting device;

FIG. 4 is a front view of the sighting device;

FIG. 5 is a top plan view of the sighting device;

FIG. 6 is a side view of the sighting device;

FIG. 7 is a view showing the sighting device in folded position;

FIG. 8 is an enlarged view taken substantially as indicated by line 8—8 on FIG. 7;

FIG. 9 is an enlarged detailed sectional view taken substantially as indicated by line 9—9 on FIG. 2.

DESCRIPTION OF THE PREFERRED EMBODIMENT

Figure 10:
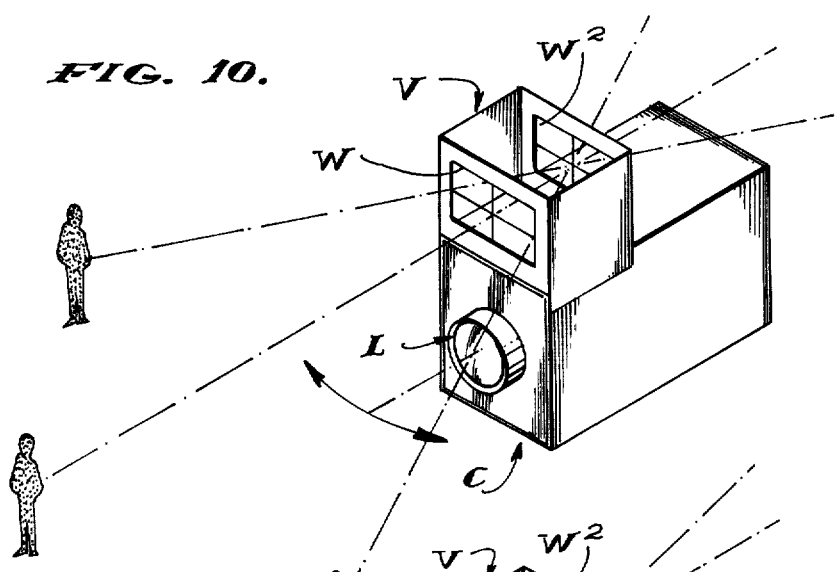
FIGS. 10 and 11 are views similar to FIG. 2, illustrating the manner in which the sighting device is used when positioning a camera.

In FIG. 1 of the drawings there is shown a typical surveillance or monitoring camera C of the type with which the subject sighting device can be used. The camera C includes an elongate rectilinear box-like case B with substantially flat, parallel horizontal top and bottom sides 12 and 13, and substantially flat, vertical lateral sides 14. Positioned within the case B and axially removable therefrom is a camera mechanism which includes front and rear walls 10 and 11, respectively, and a lens L which projects from the front wall.

In addition to the foregoing, the case B is provided with a semi-universal mounting means M to facilitate mounting the camera on a suitable supporting structure (not shown) and to allow for pivoting and swinging the camera on and about two right anguiarly related axes whereby the angular disposition of the camera can be adjusted.

The camera C can be a power driven time-lapse photographic camera which operates to intermittently advance and expose photographic film at predetermined time intervals; it can be a television camera with self-contained or remote video tape recording means; or, it can be any other suitable form of camera without departing from the spirit of or affecting the novelty of the present invention.

The field of view of the camera C is fixed, and is predetermined by the size of the lens L and the focal length thereof. In practice, the camera C can be provided with a lens of any desired size and focal length. In most surveillance cameras, standard lenses of rather short focal length and wide angle are used. For example, 35 mm. and 28 mm. lenses are most frequently used.

A sighting device constructed in accordance with the teachings of the present invention comprises an elongate rectangular frame which includes flat longitudinally spaced, parallel, front and rear end walls 20 and 21 with horizontal top and bottom edges 22 and 23 and vertical side edges 24; and a pair of elongate, flat laterally spaced, parallel, vertical side walls 25 with horizontal top and bottom edges 26 and 27 and with vertical end edges 28 related to the vertical side edges 24 of the end walls 20 and 21 by coupling means H. In the form of the invention illustrated in the drawings, the side walls 25 have vertical oriented flanges 30 extending longitudinally of and depending from the lower edges 27. The flanges 30 are integral extensions of the walls 25.

The front and rear walls 20 and 21 are provided with axially aligned windows W and $W^2$. The window W is rectangular in shape and is proportionally the same as the effective field of view of the picture produced by the camera C. The size of the window W is such that a line of sight about the perimeter of that window (or guidelines positioned within the window) and intersecting the central longitudinal axis of the windows at the plane of the rear window $W^2$, substantially circumscribes or includes within its limits the field of view of the camera C when the sighting device is positioned adjacent the front end of the camera case with its front wall at the front edge of the case B.

The rear window $W^2$ should be sufficiently large to allow the person adjusting the camera, when positioned rearward of the camera, to sight freely forwardly through the sighting device. The window $W^2$ is preferably the same size as the front Window W in order to facilitate the construction of the device and to also provide for easier viewing.

For reasons of economy and for purposes of folding, the sighting device is preferably made of a single piece of paper card stock. The coupling means H are hinge means and are established by folding the card stock or by scoring, creasing or otherwise forming the portions of the card stock which occur between and/or join adjacent walls together.

The front window W is provided with horizontal and vertical "cross-hairs" 30 and 31 which intersect at the central longitudinal axis of the window and which define the upper and lower, right and left-hand quarters of the field of view of the camera C.

The rear window $W^2$ is provided with a central sighting mark 33 on the central longitudinal axis of that window, which mark is established by intersecting horizontal and vertical "cross-hairs" 34 and 35.

In practice, the "cross-hairs" 30, 31, 34 and 35 can be established by lengths of wire, ribbon or other like material extending across the windows and having ends suitably fixed to the walls 20 and 21. In the preferred construction and as shown in the drawings, the several cross-hairs are established by lines of opaque material such as ink or paint printed or otherwise applied to surfaces of panes 36 of thin, clear, transparent material such as Mylar film, suitably mounted within and extending across the windows. (Mylar is a trademark which identifies a particular plastic film produced and marketed by the DuPont Company).

If desired, the central sighting mark 33 within the rear window $W^2$, established by the intersecting cross-hairs, can be replaced with a simple opaque dot without departing from the broader aspects of the invention.

The transparent panes 36 can be mounted in the windows in a number of different ways. In FIG. 9 of the drawings, the outer perimeters of the panes 36 are shown as sandwiched between the inner surfaces of the end walls 20 and 21 and flat rectangular frames 36' of card stock, having their outer portions cemented or otherwise fixed to the inner surfaces of said end walls and with inner portions overlying the outer extremities of the panes 36.

In practice, the size of the front window W is such that when using the sighting device, the field of view corresponds to the field of view of the widest angle lens that might be used with the camera C. The pane 36 in the front window W can also be provided with a rectangular frame line 37, inwardly of the outer perimeter of the window W, and corresponding with the field of view of a lens having a smaller field of view, as might be used with the camera C. For example, the window W can be of the size required for a 28 mm. lens and the frame line 37 can be of the size required for a 35 mm. lens.

The sighting device described herein is substantially equal in lateral extent with the lateral extent of the camera case B. It is preferably positioned on the top of the case B with the front wall 20 in vertical alignment with the front edge of the case, substantially as shown in FIG. 2 of the drawings. The bottom edges 23 of the front and rear walls 20 and 21 are in supporting engagement with the top 12 of the case. The flanges 30, at the sides of the sighting device, occur outward of but in close engagement with the sides 14 of the case B and serve to set and maintain the sighting device on the case with the cross-hairs in vertical and axial alignment.

With the sighting device V and camera C thus aligned, the person aiming and setting the camera places himself rearward of the camera and sights forwardly through the windows. By turning the camera horizontally about a vertical axis, he can easily and quickly set the camera so that the desired horizontal field of view is within the field of view of the camera, as illustrated in FIG. 10 of the drawings.

Figure 11:
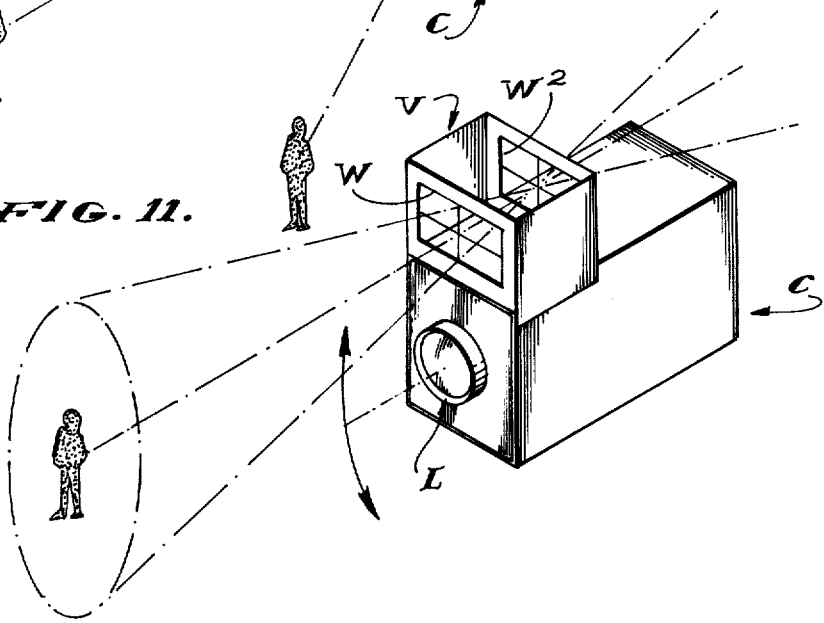

Thereafter, while sighting through the sighting device, he can pivot the camera vertically about a horizontal axis to effect adjustment and setting of the vertical sight of the camera as illustrated in FIG. 11 of the drawings.

Before the sighting device V is put to its intended use, and also after it has been used and is to be put aside or stored for subsequent use, the structure is collapsed to its folded position in which one side and one end wall are substantially coplanar and the other side and other end wall are substantially coplanar, and with both sets of walls in superposed position as illustrated in FIGS. 7 and 8 of the drawings.

When the sighting device V is thus folded, it can be easily and conveniently positioned in an envelope or the like for safe storage or for delivery from one location to another, as by a postal service or the like.

Having illustrated and described only one typical preferred form and embodiment of the invention, I do not wish to be limited to any specific details herein set forth but wish to reserve to myself any modifications and/or variations that may appear to those skilled in the art and which fall within the scope of the following claims.

What is claimed is:

1. A temporary sighting device for cameras, comprising:
   a rectangular frame having substantially parallel, axially spaced front and rear walls with substantially parallel, opposite side edges, and central axially aligned windows with outer perimeters;
   opposed side walls with substantially parallel opposite side edges;
   means joining the side edges of the side walls with related side edges of the end walls;
   means to mount and orient said frame on a camera case;

the aforesaid means joining the edges of the side and end walls being hinged, whereby said frame is foldable between an operative position in which the planes of the end walls are normal to the planes of the side walls, and a folded position in which the planes of the end walls are substantially parallel with the planes of the side walls and said side and end walls are in juxtaposition; and a set of related sighting markings within the perimeters of the windows in alignment on the central longitudinal axis of the frame.

2. The sighting device described in claim 1, in which said frame is comprised of paper card stock formed and folded to define the several walls and edges.

3. The sighting device described in claim 1, in which the sighting markings within the perimeter of the windows comprise a set of angularly related cross-hairs within and extending across each window on the central longitudinal axis of the frame.

4. The sighting device described in claim 1, in which lines of sight extending through an intersection of the sighting marking in the window in the rear wall and about the outer perimeter of the window in the front wall circumscribe a field of view of the camera with which the sighting device is to be used, and the sighting marking in the window in the front wall cooperates with the sighting marking in the window in the rear wall to direct the line of sight through the device to the center of the field of view.

5. The sighting device set forth in claim 3 wherein lines of sight extending through an intersection of the cross-hairs in the window in the rear wall and about the outer perimeter of the window in the front wall circumscribe a field of view of a camera with which the device is to be used, and the cross-hairs in the window in the front wall cooperate with the cross-hairs in the window in the rear wall to direct the line of sight through the structure to the center of the field of view.

6. The sighting device described in claim 3, in which panes of clear, transparent film are mounted within and extend across the windows, and said cross-hairs are defined by lines of opaque material applied to the surfaces of said panes.

7. The sighting device described in claim 3, which further includes a second set of markings in the front window which are parallel with and spaced inwardly a predetermined distance from the perimeter of said window, whereby lines of sight extending through an intersection of the cross-hairs in the window in the rear wall and said second set of markings in the front wall circumscribe a reduced field of view of the camera with which the sighting device is used, and the cross-hairs in the windows in the front and rear walls cooperate to direct a line of sight through the device to the center of the field of view.

* * * * *